United States Patent
Hsu et al.

(10) Patent No.: US 10,152,046 B2
(45) Date of Patent: Dec. 11, 2018

(54) AUTOMATIC MACHINING FORCE OPTIMIZING SYSTEM AND METHOD FOR NC PROGRAM

(71) Applicant: INDUSTRIAL TECHNOLOGY RESEARCH INSTITUTE, Hsin-Chu (TW)

(72) Inventors: Chih-Yuan Hsu, Kaohsiung (TW); Yu-Ling Chang, Taichung (TW); Yu-An Tseng, Taichung (TW); Shuo-Peng Liang, Taichung (TW); Tzuo-Liang Luo, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 92 days.

(21) Appl. No.: 15/392,191

(22) Filed: Dec. 28, 2016

(65) Prior Publication Data

US 2018/0150060 A1 May 31, 2018

(30) Foreign Application Priority Data

Nov. 29, 2016 (TW) .............................. 105139298 A

(51) Int. Cl.
*B23Q 15/12* (2006.01)
*G05B 19/4093* (2006.01)

(52) U.S. Cl.
CPC ................. *G05B 19/40937* (2013.01); *G05B 2219/36489* (2013.01)

(58) Field of Classification Search
CPC .......... G05B 19/4097; G05B 19/40937; G05B 19/416; G05B 19/4163; G05B 19/4093;
(Continued)

(56) References Cited

U.S. PATENT DOCUMENTS 3,665,493 A * 5/1972 Glowzewski ...... G05B 19/4163
318/561
3,849,712 A * 11/1974 Lankford ........... G05B 19/4163
318/561
(Continued)

FOREIGN PATENT DOCUMENTS

CN 102331749 A 1/2012
CN 104252153 A 12/2014
(Continued)

OTHER PUBLICATIONS

Taiwanese Office Action and Search Report for Taiwanese Application No. 105139298, dated May 24, 2017.
(Continued)

*Primary Examiner* — Darrin D Dunn
(74) *Attorney, Agent, or Firm* — Birch, Stewart, Kolasch & Birch, LLP

(57) ABSTRACT

A system and a method for optimizing machining force of NC program is disclosed. The system includes a tool path acquisition unit and a NC program optimizing unit; the tool path acquisition unit is for acquiring a coordinate set of points composed by a coordinate information outputted by a controller, and modifying with respect to the coordinate set of points so as to form a tool path; the NC program optimizing unit is for analyzing machining force in accordance with the tool path, a tool information, a workpiece information and a machine tool characteristic information, and modifying with modified processing feed rates to generate an optimized NC program.

10 Claims, 7 Drawing Sheets

(58) Field of Classification Search
CPC .... G05B 19/41865; G05B 2219/45044; G05B 2219/49099; G05B 19/19; G05B 2219/37355; G05B 19/18; G05B 19/4083; G05B 2219/35168; G05B 2219/35215; G05B 2219/35219; G05B 2219/36231; G05B 2219/36252; G05B 2219/36289; G05B 2219/41376; G05B 2219/43057; G05B 2219/43203; G05B 2219/45031; G05B 19/4068; G05B 19/4142; G05B 2219/49075; G05B 2219/49093; G05B 2219/49369; G05B 2219/49372; G05B 2219/49375; G05B 2219/50065; G05B 2219/50197

See application file for complete search history.

(56) References Cited

U.S. PATENT DOCUMENTS

| | | | | |
|---|---|---|---|---|
| 4,907,164 | A * | 3/1990 | Guyder | G05B 19/41 700/173 |
| 6,604,015 | B2 * | 8/2003 | Iriguchi | G05B 19/4097 318/567 |
| 6,766,214 | B1 * | 7/2004 | Wang | G05B 19/41865 438/14 |
| 6,942,436 | B2 * | 9/2005 | Kakino | G05B 19/40937 409/80 |
| 6,985,825 | B1 * | 1/2006 | Good | G05B 19/41865 700/108 |
| 7,047,102 | B2 * | 5/2006 | Ikeda | G05B 19/40937 700/172 |
| 7,050,883 | B2 | 5/2006 | Cho et al. | |
| 7,070,368 | B2 * | 7/2006 | Murakami | B23Q 15/013 409/80 |
| 7,096,087 | B2 * | 8/2006 | Sagawa | G05B 19/4093 700/160 |
| 7,117,056 | B2 * | 10/2006 | Balic | G05B 19/4099 700/104 |
| 7,792,604 | B2 * | 9/2010 | Hong | G05B 19/41 700/187 |
| 7,933,679 | B1 * | 4/2011 | Kulkarni | G05B 13/0265 700/173 |
| 8,489,224 | B2 * | 7/2013 | Berman | G05B 19/4093 700/159 |
| 8,676,372 | B1 * | 3/2014 | Bolin | G05B 19/4163 700/190 |
| 8,788,083 | B2 * | 7/2014 | Atabey | G05B 19/404 700/160 |
| 8,954,185 | B2 | 2/2015 | Lammering et al. | |
| 9,229,442 | B2 * | 1/2016 | Kaminski | G05B 19/404 |
| 9,658,613 | B2 * | 5/2017 | Henning | G05B 19/4097 |
| 2001/0000805 | A1 * | 5/2001 | Kadono | G05B 19/4097 700/182 |
| 2001/0021881 | A1 * | 9/2001 | Iriguchi | G05B 19/4097 700/160 |
| 2003/0045964 | A1 * | 3/2003 | Lottgen | G05B 19/409 700/180 |
| 2003/0125828 | A1 * | 7/2003 | Corey | G05B 19/409 700/186 |
| 2003/0170085 | A1 * | 9/2003 | Kakino | G05B 19/40937 409/132 |
| 2004/0121495 | A1 * | 6/2004 | Sonderman | H01L 22/20 438/14 |
| 2005/0038552 | A1 * | 2/2005 | Sagawa | G05B 19/4093 700/181 |
| 2005/0113963 | A1 * | 5/2005 | Cho | G05B 19/19 700/188 |
| 2005/0171622 | A1 * | 8/2005 | Horn | B62K 15/00 700/18 |
| 2008/0033592 | A1 * | 2/2008 | Okrongli | G05B 19/4083 700/179 |
| 2009/0164038 | A1 * | 6/2009 | Bretschneider | G05B 19/4063 700/105 |
| 2009/0326680 | A1 * | 12/2009 | Landgraf | G05B 19/042 700/49 |
| 2010/0063609 | A1 * | 3/2010 | Kohring | G05B 19/4142 700/108 |
| 2010/0076959 | A1 * | 3/2010 | Ramani | G06F 17/30277 707/722 |
| 2014/0017252 | A1 * | 1/2014 | Wohl | C07K 16/30 424/139.1 |
| 2014/0123740 | A1 * | 5/2014 | Yoshikawa | B23Q 17/0961 73/104 |
| 2014/0256228 | A1 * | 9/2014 | Kaminski | G05B 19/404 451/28 |
| 2015/0045923 | A1 | 2/2015 | Chang et al. | |
| 2015/0088301 | A1 * | 3/2015 | Erdim | G05B 19/18 700/190 |
| 2015/0127139 | A1 * | 5/2015 | Bolin | G05B 19/4065 700/173 |
| 2017/0269571 | A1 * | 9/2017 | Pitz | G05B 13/021 |

FOREIGN PATENT DOCUMENTS

| | | |
|---|---|---|
| CN | 104407568 A | 3/2015 |
| TW | I453557 B | 9/2014 |
| TW | M529577 U | 10/2016 |
| WO | WO 2015/041024 A1 | 3/2015 |
| WO | WO 2016/065491 A1 | 5/2016 |

OTHER PUBLICATIONS

Altintas et al., "Virtual process systems for part machining operations", CIRP Annals—Manufacturing Technology, vol. 63, 2014, pp. 585-605.

Attanasio et al., "Optimization of tool path in two points incremental forming", Journal of Materials Processing Technology, vol. 177, 2006, pp. 409-412.

Feng et al., "Integrated tool path and feed rate optimization for the finishin machining of 3D plane surfaces", International Journal of Machine Tools & Manufacture, vol. 40, 2000, pp. 1557-1572.

Lee et al., "Prediction of Ball-End Milling Forces From Orthogonal Cutting Data", International Journal of Machine Tools and Manufacture, vol. 36, No. 9, 1996, pp. 1059-1072.

Merdol et al., "Virtual cutting and optimization of three-axis milling processes", International Journal of Machine Tools & Manufacture, vol. 48, 2008, pp. 1063-1071.

Yazar et al., "Feed Rate Optimization Based on Cutting Force Calculations in 3-Axis Milling of Dies and Molds With Sculptured Surfaces", International Journal of Machine Tools and Manufacture, vol. 34, No. 3, 1994, pp. 365-377.

* cited by examiner

AUTOMATIC MACHINING FORCE OPTIMIZING SYSTEM AND METHOD FOR NC PROGRAM

CROSS REFERENCE TO RELATED APPLICATION

This application also claims priority to Taiwan Patent Application No. 105139298 filed in the Taiwan Patent Office on Nov. 29, 2016, the entire content of which is incorporated herein by reference.

BACKGROUND OF THE DISCLOSURE

1. Field of the Disclosure

The disclosure relates to a system and a method for optimizing machining force for NC program, and more particularly, to a system and a method for optimizing machining force for NC program that a coordinate set of points is formed by connecting to a machine tool's controller and acquiring coordinate information outputted by the controller, then to aim at the coordinate set of points to perform coordinate expansion or constriction so as to form a tool path, and then undertake the cutting mechanics analysis and optimization to improve the process efficiency, in the meantime, to resolve the tool damage problem caused by excessive tool machining force.

2. Description of the Prior Art

Processing time and processing cost are the key factors of the competitiveness of processing plants. These two factors directly affect the ability of taking orders for the plant and product's gross profit. Therefore, how to select appropriate machining conditions to improve production capacity has been the key issue of this industry.

Conventionally, the CNC (Computer Numerical Control) machine tool is used to perform processing with its design mode of NC (Numerical Control) NC program through engineer's use of process-aided software (CAD/CAM) to plan the tool path. However, since the NC program (G code) including the macroinstruction defined by different controllers mostly can not accurately express the geometric structure or contour of the workpiece, and the extent of support of the above-mentioned processing aided software system with respect to "that the existing NC program is interpreted as tool path" is insufficient too, thereby, it is difficult to obtain the actual tool path, therefore, it is not easy to perform the diagnosis of tool path. As the engineers are lack of scientific methods to adjust the machining conditions, all they can do is to adjust through their experience. In order to lower the processing time, a relatively excessive machining condition is mostly used which results in tool damage or even breaking and consequently causes workpiece's wearing and cost rising, or a relatively conservative machining conditions is used which results in poor processing efficiency. In other words, the engineers at the processing terminal are unable to change the original NC program code but only following the original NC program code to perform the planning and adjustment of the processing path.

FIG. 1 is a schematic drawing showing the cutting path of the conventional tool path acquisition method of the prior art. As shown in FIG. 1, to perform machining for a triangular hole 90 having three corners 91 to 93 and three sides 94 to 96 according to the conventional NC code is shown, where the solid line represents the actual machining path taken by the conventional method and the dotted line represents the actual machining path taken by one of the disclosed methods. The origin is a single G code block. With one side 96, an example of a tool path profile of the prior art is as follows:

"FEDRAT/200
$$O0102N12
GOTO/-9.6, -5.372, -19.853
GOTO/-9.6, -5.372, -19.96
$$ O0102N13
GOTO/-9.567, -5.43, -20
GOTO/-7.153, -9.61, -20
GOTO/-7.113, -9.679, -20"

Wherein, "GOTO/-9.6, -5.372, -19.96" represents the coordinates of the point 98. "GOTO/-9.567, -5.43, -20" represents the coordinates of point 99. Since the conventional coordinate set of points extraction method can not obtain the coordinates of the end point 97, if the tool path is composed of this set, the corner path error will be caused and the tool will be skewed from point 98 to point 99 instead of point 97. For example, an example of a known cutter path is as follows:

"FEDRAT/200
$$ O0102N14
GOTO/-6.961, -9.622, -20
GOTO/-2.712, -7.169, -20
GOTO/-2.527, -7.062, -20
GOTO/6.341, -1.942, -20"
$$ O0102N15 wherein, GOTO/-6.761, -9.622, -20"," GOTO/-2.712, -7.169, -20"," GOTO/-2.527, -7.062, -20"," GOTO/6.341, -1.942, 20 "represents the coordinates of points 911 to 914, respectively. That is, according to the conventional coordinate set of points acquisition method, the tool cuts the corner 91 in a plurality of sharp paths, and since there is no curve fitting, the cut corner 91 is actually constituted by many sharp corners, thereby, is unable to accurately appear a smooth arc; angle 92,93 also in similar situation.

Therefore, just how to have a "system and method for optimizing machining force for NC program" to acquire a tool path to perform coordinate expansion or constriction so as to form a tool path modified information, and then undertake the machining mechanics analysis and optimization to improve the process efficiency, in the meantime, to resolve the tool damage problem caused by excessive tool machining force, is an issue urgently needed to resolve in the related technical field.

SUMMARY OF THE DISCLOSURE

In light of the disadvantages of the prior arts, the disclosure provides a separable buoy that aims to ameliorate at least some of the disadvantages of the prior art or to provide a useful alternative.

In an embodiment, the disclosure presents an automatic machining force optimizing system for NC program. The technical means are as follows:

An embodiment is an automatic machining force optimizing system for NC program, comprising:
  a tool path acquisition unit for acquiring a coordinate information outputted by a controller to generate a coordinate set of points, and performing a modification with respect to the coordinate of the coordinate set of points; and
  a NC program optimizing unit for analyzing the machining force and modifying the processing feed rate in accordance with the coordinate of the tool path, as well as the tool information, the workpiece information and the machine tool characteristic information, to generate an optimized NC program.

Another embodiment is an automatic machining force optimization method for NC program, comprising the following steps:

acquiring the coordinate information outputted by the controller to generate a coordinate set of points, and performing a modification with respect to the coordinate of the coordinate set of points so as to generate a tool path; and analyzing machining force and modifying the processing feed rate in accordance with the coordinate of the tool path, as well as a tool information, a workpiece information and a machine tool characteristic information to generate an optimized NC program.

BRIEF DESCRIPTION OF THE DRAWINGS

The accomplishment of this and other objects of the disclosure will become apparent from the following description and its accompanying drawings of which.

DETAILED DESCRIPTION OF THE PREFERRED EMBODIMENT

The following descriptions are embodiments of the disclosure employing some particular concrete examples. Those people skilled in the art are capable of easily realizing the advantages and efficacies of the disclosure through the content disclosed by the patent specification of the disclosure.

Figure 2:
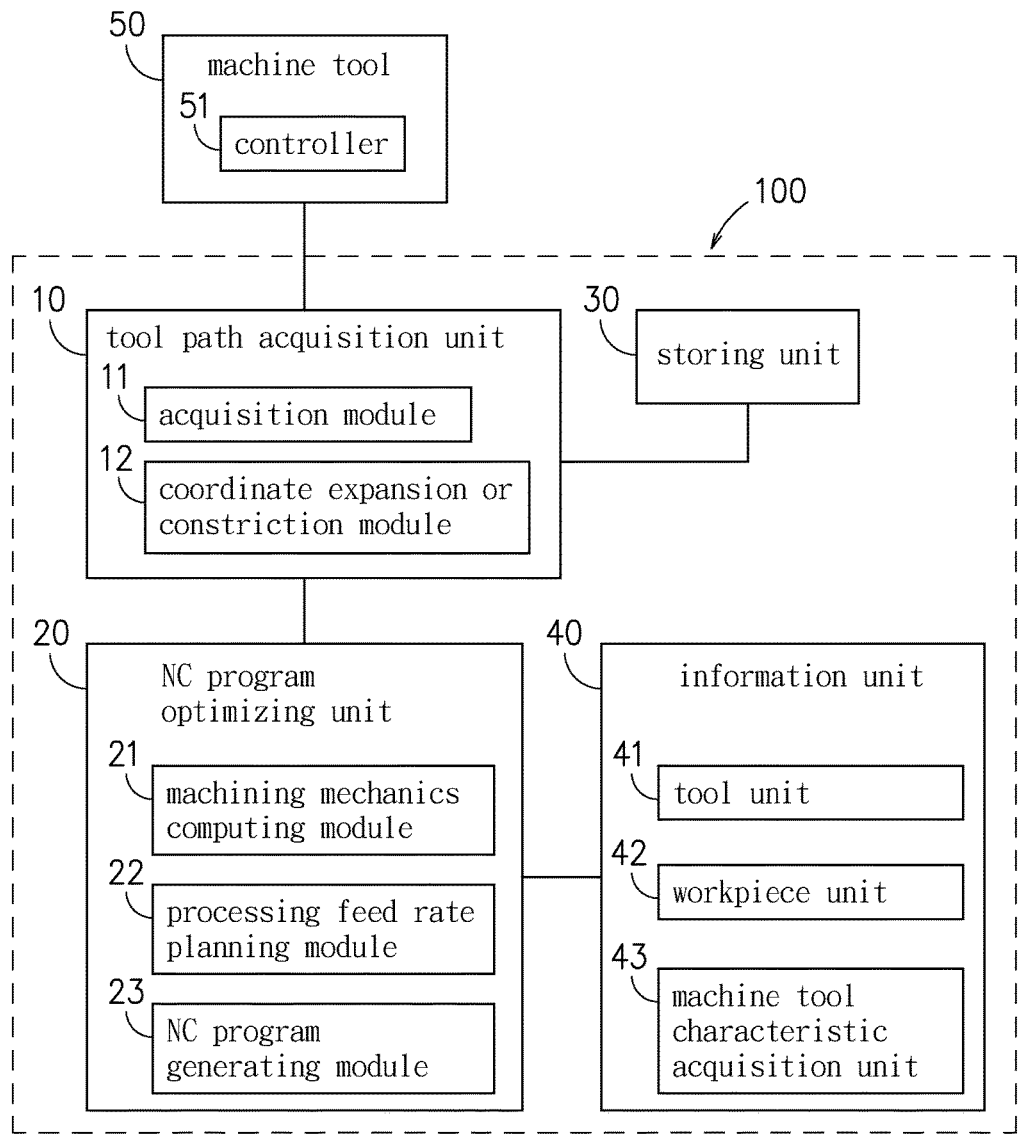
FIG. 2 is a block diagram of the system of automatic machining force optimizing showing the mechanism of the embodiment of the disclosure.

FIG. 2 is a block diagram of the system to optimize machining force for NC program showing the mechanism of the embodiment of the disclosure, As shown in FIG. 2, the system to optimize machining force for NC program of the disclosure includes a tool path acquisition unit 10 and a NC program optimizing unit 20. The automatic NC program machining force optimizing system 100 is connected to the controller 51 which is used to perform a NC program, and the controller 51 drives the tool in accordance with the NC program to control the machine tool 50 to perform processing with respect to the workpiece.

The tool path acquisition unit 10 is employed to acquire the coordinate information outputted by the controller 51 during the actual processing or tried run testing, thus a coordinate set of points is generated according to the coordinate information. Moreover, modifications are performed with respect to the majority of the coordinate in the coordinate set of points for the enlarged increase or constriction of the coordinate quantity to generate a tool path which indicates the combination of a majority of coordinate passed through by the tool wherein the machine tool 50, for example, is a machine tool having any number of shaft or spindle, or is a numerical control machine tool. The NC program, for example, is a NC program code which can be stored in the controller 51 of the machine tool 50, for example, is a central control device or a numerical controller, for controlling the motion of the machine tool, but what is depicted above is merely an exemplary description and does not limit to the style of the tool.

The tool path acquisition unit 10 includes an acquisition module 11 and a coordinate expansion or constriction module 12. The acquisition module 11 is configured for acquiring the coordinate set of points which further includes a multiplicity of coordinate which also is segmented by a multiplicity of blocks with each of the blocks includes the line number, processing feed rate, spindle's or main shaft's rotation per minute (rpm) etc. The coordinate expansion or constriction module 12 is for performing the modification of quantity expansion or constriction with respect to the majority coordinate of the coordinate set of points to form a tool path. The coordinate expansion or constriction module 12 is to perform the identification of path geometric shape or contour by the use of each of the blocks so as to perform the expansion or constriction of the coordinate, wherein the path geometric shape also includes straight line and circular arc. The tool path acquisition unit 10 being electrically connected to the storing unit 30 is for storing the tool path.

The NC program optimizing unit 20 is for generating an optimized NC program by the use of the information of the majority of coordinate, tool and machine tool characteristics etc. in accordance with the tool path to synthetically analyze the machining force and to modify the set-up of the processing feed rate in them so as to generate the optimized NC program. The NC program optimizing unit 20, for example, includes a machining mechanics computing module 21, a processing feed rate planning module 22 and a NC program generating module 23. The machining mechanics computing module 21 is for analyzing the machining force in accordance with the information of the tool path, the workpiece and the machine tool characteristics etc.; the processing feed rate planning module 22 is for modifying the processing feed rate in accordance with the machining force; while the NC program generating module 23 is for modifying the tool path with the modified processing feed rate to generate an optimized NC program. The NC program optimizing unit 20 being electrically connected to the controller 51 of the machine tool 50 can have the optimized NC program transmit to the controller 51 of the machine tool 50 or can be stored.

The NC program optimizing unit 20 being electrically connected to the information unit 40 has the tool information, the workpiece information and the machine tool characteristics etc. stored in the information unit 40. The information unit 40 includes a tool unit 41, a workpiece unit 42 and a machine tool characteristics acquisition unit 43. The tool unit 41 is for managing tool geometric data and storing the tool geometric data as tool information; the workpiece unit 42 is for managing workpiece geometric data and workpiece material, and storing the workpiece geometric data and the workpiece material as workpiece information; the machine tool characteristic acquisition unit 43 is for acquiring the characteristic data of the machine tool and storing the machine tool characteristic data as machine tool characteristic information which includes the maximum acceleration and the stroke limit etc. The NC program optimizing unit 20 can synthesize the above-mentioned tool information, workpiece information and machine tool characteristic information to perform synthetic analysis when it comes to analyzing the machining force of the tool path.

Figure 3:
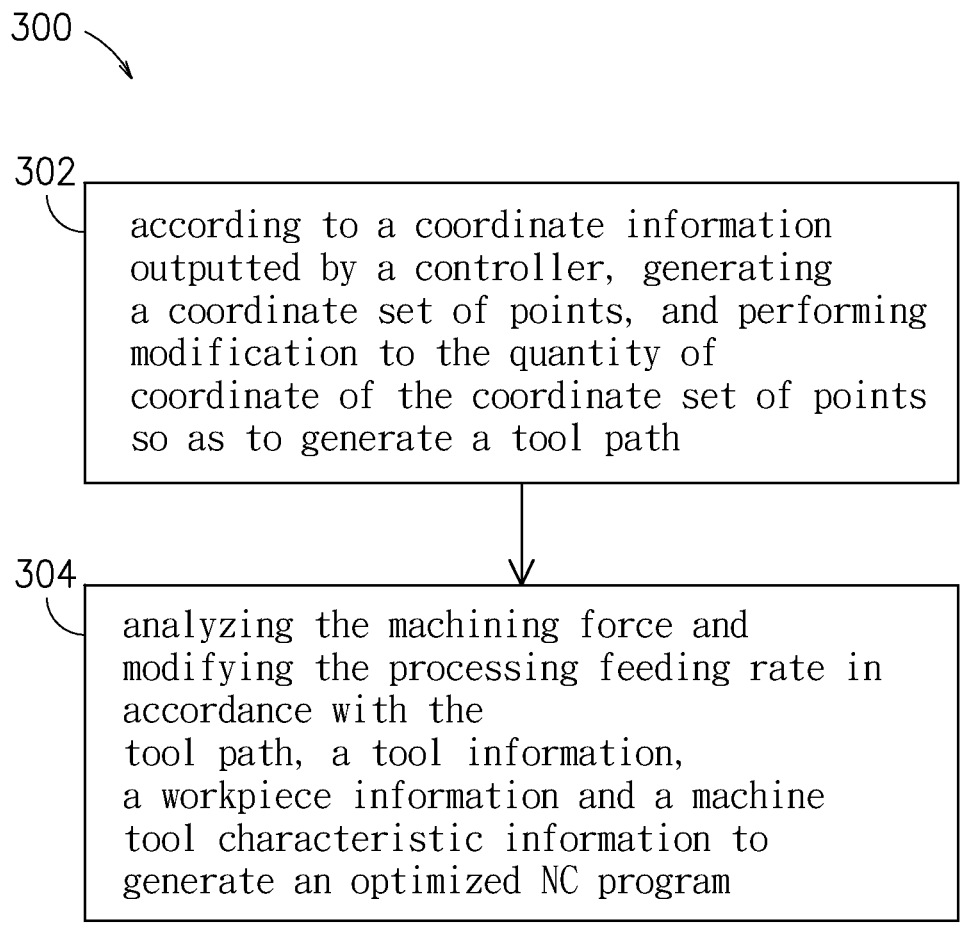
FIG. 3 is a flowchart of the method by the automatic machining force optimizing system of the embodiment of the disclosure.

FIG. 2 is a block diagram of the system of automatic NC program machining force optimizing showing the mechanism of the embodiment of the disclosure while FIG. 3 is a flowchart of the method by the automation NC program machining force optimizing system of the embodiment of the disclosure. As shown in FIG. 2 and FIG. 3, by the use of automatic NC program machining force optimizing system 100 of the disclosure as shown in FIG. 2, the embodiment flowchart of the automatic machining force optimization method for NC program 300 of the disclosure as shown in FIG. 3, including:

STEP 302: acquiring a coordinate set of points composed of a coordinate information outputted by a controller and performing quantity expansion or constriction with respect to the coordinate set of points so as to generate a tool path. The generation method of the tool path is to utilize the combination of blocks and the coordinate set of points, wherein the block includes line number, spindle's or main shaft's rotation per minute and processing feed rate etc. and can utilize the tool path geometry to have the tool path shift to the processing position of the workpiece and can also utilize the information of the NC program's line number or recognizable block's information to combine with the coordinate set of points to calculate the slope, direction vector so as to perform curve/arc expansion or straight line constriction of coordinate, it can further utilize the information of the NC program's line number or recognizable block's information to combine with G code and the coordinate set of points to perform curve/arc expansion or straight line constriction of coordinate. Or, the generation method of the tool path is to utilize the combination of the block and the coordinate set of points to perform curve/arc expansion or straight line constriction of coordinate which are pre-read by the controller having program look-ahead function.

STEP 304: analyzing the machining force and modifying the processing feed rate to generate an optimized NC program. By the use of the NC program optimizing unit 20 and in accordance with coordinates of the tool path, to analyze the machining force of the tool path and to modify the processing feed rate in them so as to generate an optimized NC program and transfer to the machine tool 50 to be executed or stored. In this step, after the tool path acquisition unit 10 has the temporary stored tool path been transformed into the required format, stored and transferred to the machining mechanics computing module 21, in the mean time, the tool unit 41, the workpiece unit 42, and the machine tool characteristic acquisition unit 43 also input each of the information to the machining mechanics computing module 21 which analyzes the machining force in accordance with the tool path, tool characteristic and workpiece geometry, wherein the tool characteristic includes the tool geometry, tool material etc. Afterward, the NC program generating module 23 generate the optimized NC program in accordance with the processing feed rate, and the NC program generating module 23 is to modify with the optimized feed rate to the original NC program so as to generate the optimized NC program which does not change the original processing path.

Figure 1:
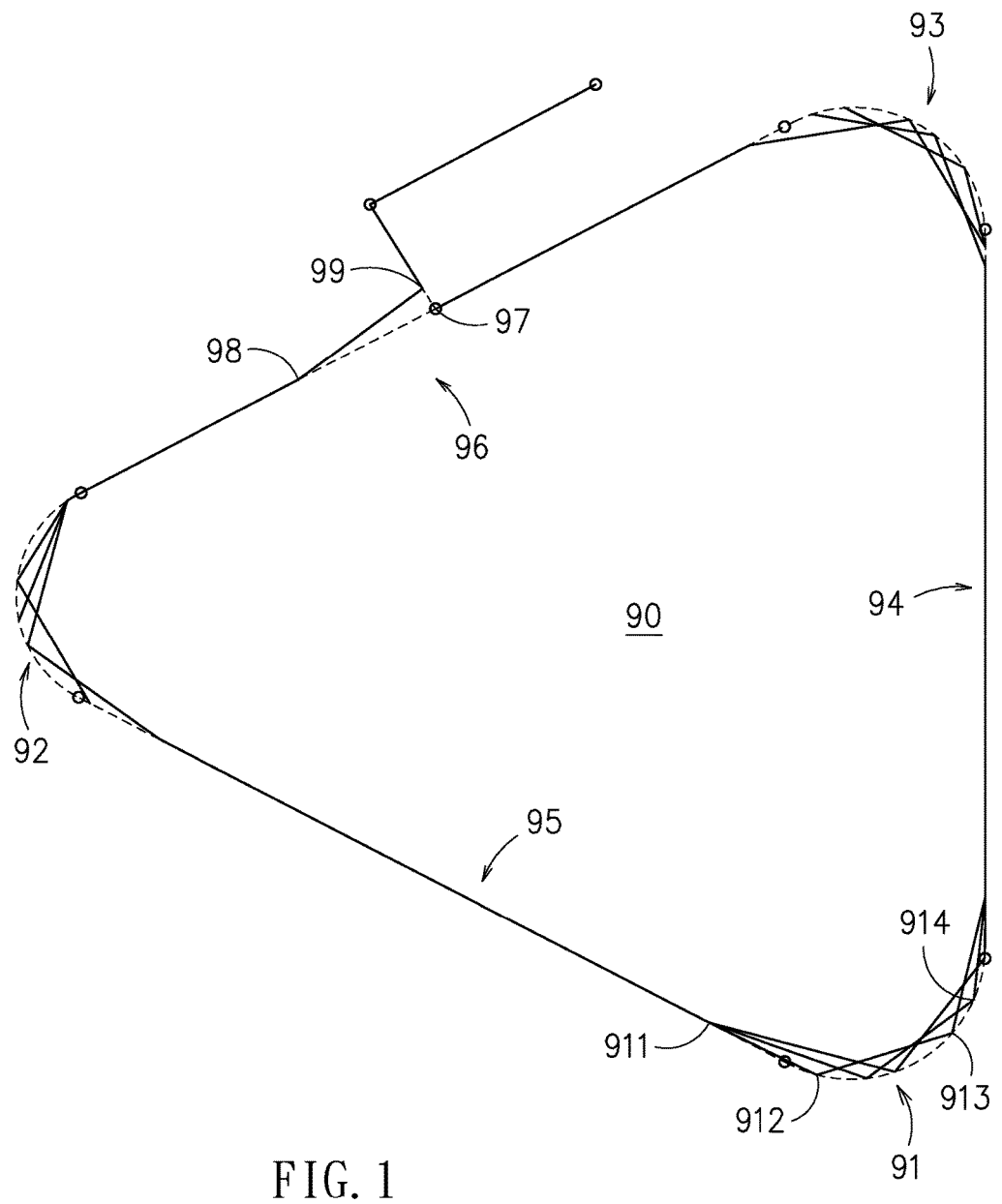
FIG. 1 is a schematic drawing showing the cutting path of the tool path acquisition method of the prior art.
Figure 4:
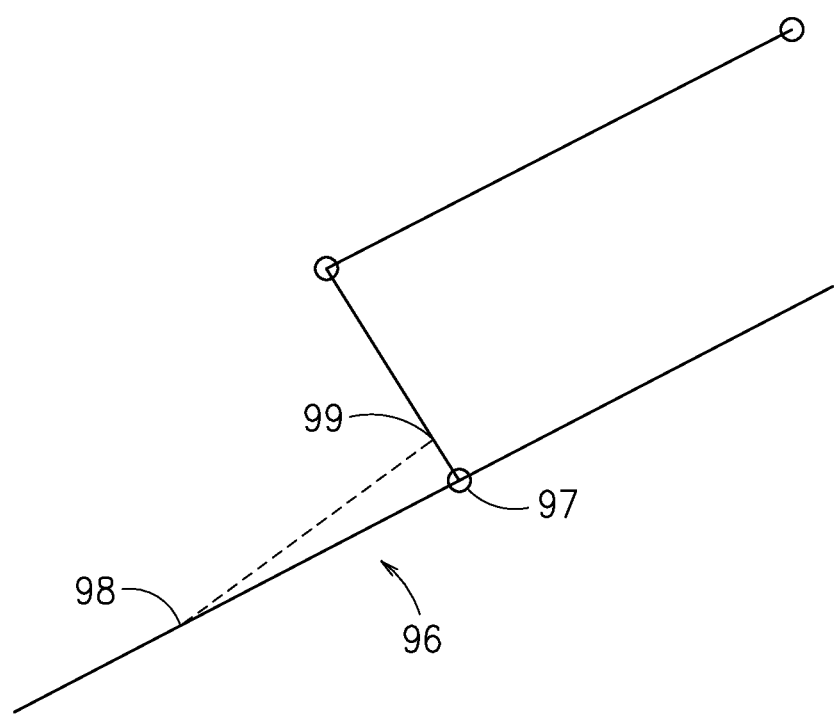
FIG. 4 is a schematic drawing of the expanded block's end point of the embodiment of the disclosure.

FIG. 4 is a schematic drawing of the expanded block's end point of the embodiment of the disclosure. As shown in FIG. 4, regarding the side 96 shown in FIG. 1, by employing the method of the disclosure, the tool path can be modified as follow:

[FEDRAT/200
$$ O0102N12
GOTO/-9.6,-5.372,-19.853
GOTO/-9.6,-5.372,-19.96
$$EndPoint$$O0102N12GOTO/-9.6,-5.372,-20
$$O0102N13
GOTO/-9.567,-5.43,-20
GOTO/-7.153,-9.61,-20
GOTO/-7.113,-9.679,-20
$$EndPoint$$O0102N13GOTO/-7.1,-9.702,-20]

Since the block's terminal can be judged, the tool can in advance from point 98 to point 97 (the coordinate is -9.6,-5.372,-20), the situation that due to the turning path error, the tool is aslant from point 98 to point 99 can be avoided.

Figure 5:
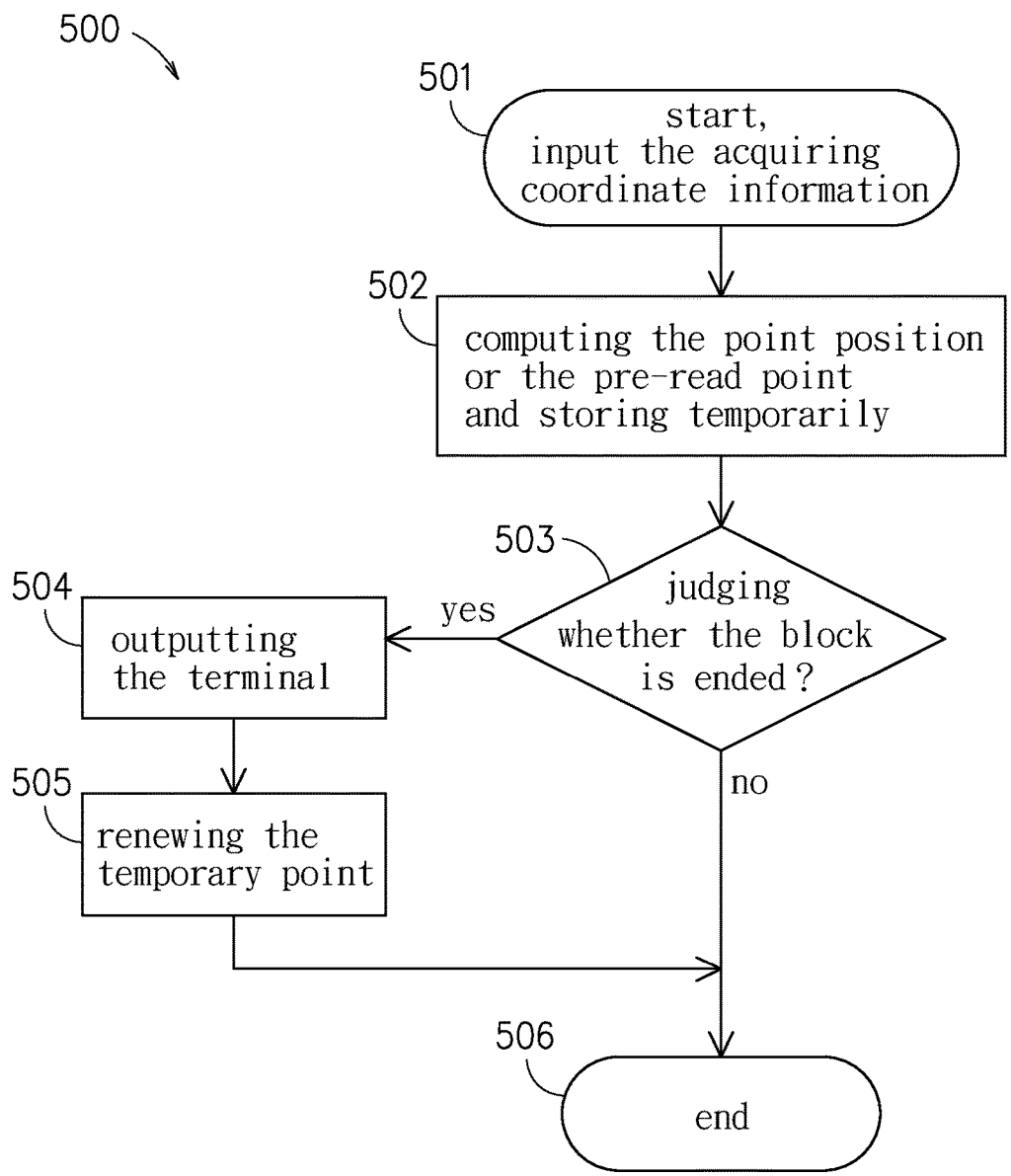
FIG. 5 is a flowchart of the method of the acquired block's end point of the disclosure.

FIG. 5 is a flowchart of the method of the acquired block's end point of the disclosure. As shown in FIG. 5, regarding the method to increase the number of the point position coordinate of curve/arc of the tool path, one can make use of flowchart 500, but not limit to the method shown as follows:

Step 501: start to input the acquiring coordinate information
Step 502: computing the point position or the pre-read point and storing temporarily
Step 503: judging whether the block is ended, i.e. the point position or the pre-read point is the same as the previous temporarily stored point, if yes, proceed to the next step 504; if no, proceed to step 506.
Step 504: outputting the terminal
Step 505: renewing the temporary point
Step 506: end Summarizing the above-mentioned steps 501~506, after the tool path acquisition unit 10 receives the coordinate information, with this judging logic, for instance, one can utilize the pre-read function to read the coordinate or remaining length of the NC program, or directly acquire the terminal coordinate to expand the point position capably acquired by the present block to assure the terminal position of the present block, and a terminal of a block is the starting point of the next block.

Figure 6:
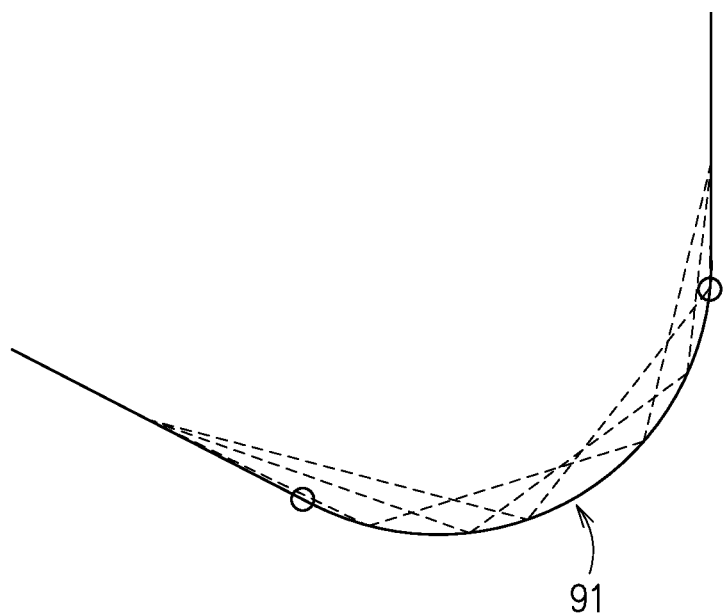
FIG. 6 is a schematic drawing of the expanded arc of the embodiment of the disclosure.

FIG. 6 is a schematic drawing of the expanded arc of the embodiment of the disclosure. As shown in FIG. 6, by employing the method of the disclosure, the tool path can be modified as follow:

[$$O0102N14
GOTO/-6.961,-9.622,-20
GOTO/-6.776,-9.515,-20
GOTO/-6.592,-9.409,-20
GOTO/-6.407,-9.302,-20
GOTO/-6.222,-9.195,-20
GOTO/-5.991,-9.062,-20
GOTO/-5.668,-8.875,-20
GOTO/-5.483,-8.769,-20
GOTO/-5.298,-8.662,-20
GOTO/-5.114,-8.555,-20
GOTO/-4.929,-8.449,-20
GOTO/-4.559,-8.235,-20
GOTO/-4.559,-8.235,-20]

Since the block's end point is acquired through the expanded block's terminal, i.e. the curve point of tool path is increased, in comparing with the method of acquiring the tool path of the prior art, by the use of the method of the disclosure, the original acquired point number is only 4 can be expanded to more point required, thereby, the disclosure can obtain much a smoother arc in the corner.

Figure 7:
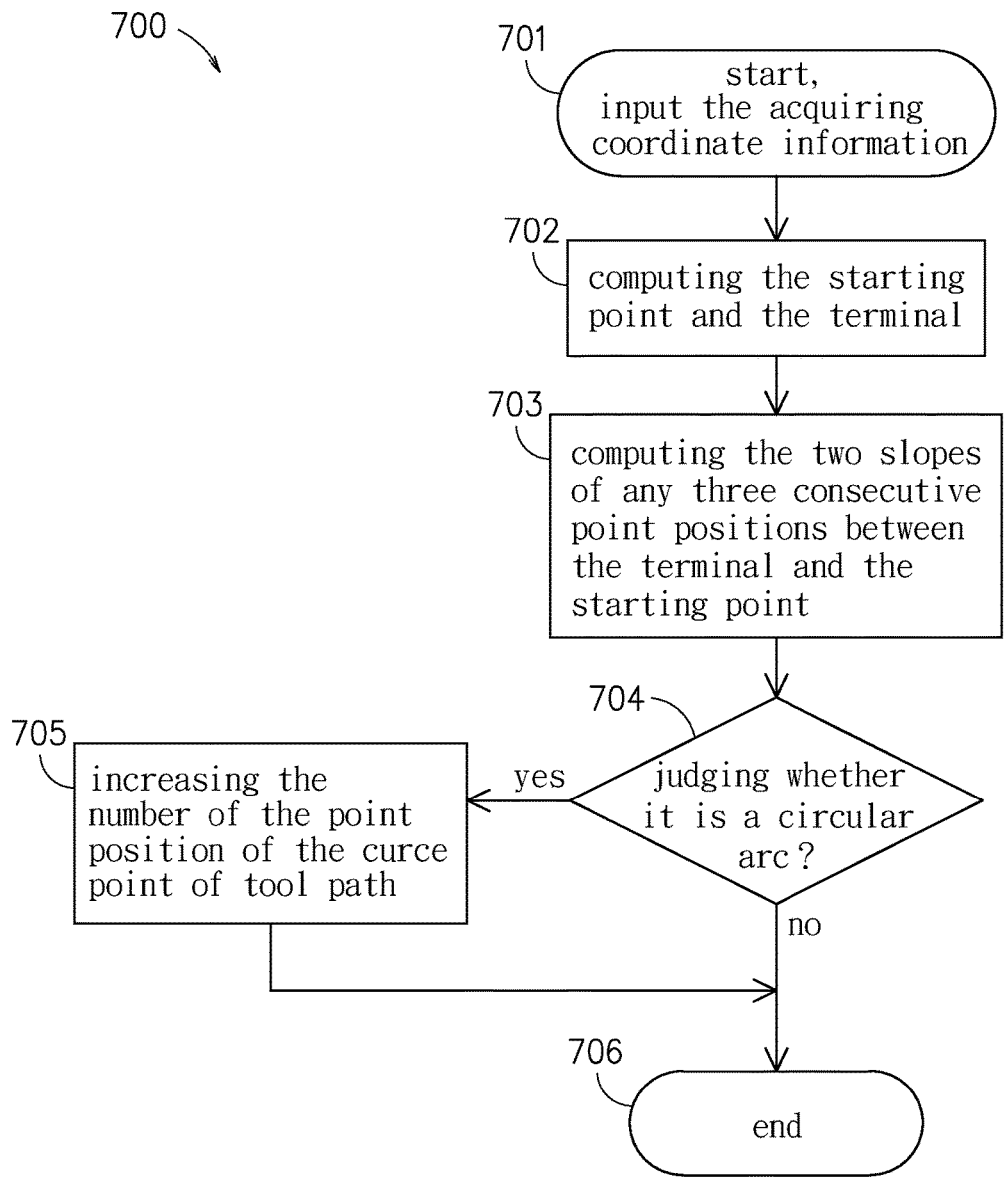
FIG. 7 is a flowchart of the method of the expanded curve point of tool path of the disclosure.

FIG. 7 is a flowchart of the method of the expanded curve point of tool path of the disclosure. As shown in FIG. 7, regarding the method to increase the number of the point position coordinate of the curve point of tool path, one can make use of flowchart 700, but not limit to the method shown as follows:

Step 701 start to input the acquiring coordinate information

Step 702 computing the starting point and the terminal

Step 703: computing the two slopes of any three consecutive point positions between the terminal and the starting point, wherein any of the two point positions forms a straight lines 12, 13 and each straight line has a slope.

Step 704 judging whether it is a circular arc?
if yes (two slopes are different), then proceed to step 705,
if no (two slopes are the same such as two straight lines), then proceed to step 706

Step 705 increasing the number of the point position of the curve point of tool path Step 706: end Summarizing the above-mentioned steps 701~706, the method to increase the tool path of the curve point is from the starting point to the terminal, any two consequent first point and second point determines a straight lines 12, 13, if the third point is not on the extension of these straight lines 12, 13, then a curve is simulated, i.e. increase the number of the point positions. Similarly, if the third point is on the straight lines 12, 13, then that the three points are on a line is judged but the third point is possibly a terminal temporarily stored, then the fourth point can be used to confirm.

In summary, the disclosure provides a system and a method of optimizing machining force for NC program that acquire the modified coordinates of the tool path and then introduces the machining mechanics computation to be a basis for the NC program design. Through the controller to collect coordinates of point positions, processing feed rates and program line numbers, to acquire expansion technique in accordance with the tool path to expand path acquiring point position, and to form tool path information. Afterward, it performs machining mechanics analysis and optimizes the processing feed rate with respect to this path, thereby, the production efficiency can be optimized, process efficiency can be improved, the processing precision can be elevated as well as the problem of the tool damage caused by the excessive machining force can also be resolved. In addition, the disclosure is appropriate to apply in providing the controller and the existing NC program of the communication module, is time-saving (background execution without occupying machine's operation), and capable of resolving the problems that the tool path is not easy to acquire and the lacking fidelity of the tool path.

It is worth emphasizing that what is acquired is coordinate set of points and since the disclosure provides a system and a method of optimizing machining force for NC program blocks which, through combination, are modified into tool path/APT, then, through optimization, are transferred into NC program (G code/NC), afterward, are transferred back to the controller for execution. The major cause lies in the fact that the machining mechanics requires the use of tool path while the difficulty of the prior art lies in the transfer between the NC program and the tool path, and the system and the method for optimizing machining process of NC program of the disclosure are capable of overcoming the difficulty.

It will become apparent to those people skilled in the art that various modifications and variations can be made to the structure of the disclosure without departing from the scope or spirit of the disclosure. In view of the foregoing description, it is intended that all the modifications and variation fall within the scope of the following appended claims and their equivalents.

What is claimed is:

1. An automatic machining force optimizing system for NC program for use in a machine tool including a controller, comprising:
a computer programmed to function as:
a tool path acquisition unit configured to acquire a coordinate information outputted by a controller to generate a coordinate set of points, and to perform a modification with respect to the coordinate set of points to generate a tool path;
a NC program optimizing unit configured to analyze machining force of the tool path and to modify processing feed rates in accordance with the tool path, a tool information, a workpiece information and a machine tool characteristic information, to generate an optimized NC program; and
a coordinate expansion or constriction module configured to decide a path geometric shape of the block by computing a point position or a pre-read point, judging whether the block is ended, if yes, the point position or the pre-read point is a terminal,
wherein when a path geometric shape of the blocks is a straight line, the coordinate expansion or constriction module is configured to perform a modification to decrease the number of the coordinate of the coordinate set of points, and when the path geometric shape is a circular arc, the coordinate expansion or constriction module is configured to perform a modification to increase the number of the coordinate of the coordinate set of points, and
wherein the controller of the machine tool drives the machine tool in accordance with the optimized NC program to perform a processing with respect to a workpiece.

2. The automatic machining force optimizing system as claimed in claim 1, wherein the tool path acquisition unit comprises:
an acquisition module configured to acquire blocks of the coordinate set of points, wherein each of the blocks includes processing feed rate and rotation per minute of spindle; and
the coordinate expansion or constriction module configured to perform the modification with respect to the coordinate of the coordinate set of points.

3. The automatic machining force optimizing system as claimed in claim 2, wherein the coordinate expansion or constriction module is in accordance with the path geometric shape of the blocks, wherein the path geometric shape comprises straight line and circular arc.

4. The automatic program machining force optimizing system as claimed in claim 1, wherein the NC program optimizing unit comprises:
a machining mechanics computing module configured to analyze the machining force in accordance with the tool path, the tool information, the workpiece information and the machine tool characteristic information;
a processing feed rate planning module configured to modify the processing feed rates in accordance with the machining force; and
a NC program generating module configured to modifying the tool path with the modified processing feed rates to generate the optimized NC program.

5. The automatic machining force optimizing system as claimed in claim 1, wherein the NC program optimizing unit is electrically connected to an information unit which stores the tool information, the workpiece information and the machine tool characteristic information.

6. The automatic machining force optimizing system as claimed in claim 5, wherein the information unit comprises:
  a tool unit configured to manage tool geometric data and store the tool geometric data as the tool information;
  a workpiece unit configured to manage workpiece geometric data and workpiece material, and store the tool geometric data and the workpiece material as the workpiece information; and
  a machine tool characteristic acquisition unit configured to acquire characteristic data of the machine tool and store the machine tool characteristic data as the machine tool characteristic information.

7. An automatic machining force optimization method for NC program for use in a machine tool including a controller, comprising the following steps:
  acquiring a coordinate information outputted by a controller to generate a coordinate set of points, and performing a modification with respect to the coordinate set of points so as to generate a tool path;
  analyzing machining force and modifying processing feed rates in accordance with the tool path, a tool information, a workpiece information and a machine tool characteristic information to generate an optimized NC program; and
  the controller of the machine tool driving the machine tool in accordance with the optimized NC program to perform a processing with respect to a workpiece,
  wherein the coordinate set of points comprises blocks, and the step of performing a modification to the coordinate set of points depends on a path geometric shape of the block, when the path geometric shape is a straight line, decreasing the number of the coordinate of the coordinate set of points, and when the path geometric shape is a circular arc, increasing the number of coordinate of the coordinate set of points, and
  wherein the method for deciding the path geometric shape of the block comprises: computing a point position or a pre-read point, judging whether the block is ended, if yes, the point position or the pre-read point is a terminal.

8. The automatic machining force optimization method as claimed in claim 7, wherein each of the blocks at least comprises processing feed rate and rotation per minute of spindle.

9. The automatic machining force optimization method as claimed in claim 7, wherein the method for increasing the number of coordinate of the coordinate set of points comprises the following steps: computing the two slopes out of any three previous consecutive point positions between the terminal and the starting point, if the two slopes are different, then increasing the number of coordinate of the coordinate set of points.

10. An automatic machining force optimization method for NC program for use in a machine tool including a controller, comprising the following steps:
  acquiring a coordinate information outputted by a controller to generate a coordinate set of points, and performing a modification with respect to the coordinate set of points so as to generate a tool path, wherein the coordinate set of points comprises blocks, and each of the blocks at least comprises processing feed rate and rotation per minute of spindle;
  analyzing machining force and modifying processing feed rates in accordance with the tool path, a tool information, a workpiece information and a machine tool characteristic information to generate an optimized NC program; and
  the controller of the machine tool driving the machine tool in accordance with the optimized NC program to perform a processing with respect to a workpiece,
  wherein the step of performing a modification to the coordinate set of points comprises:
    deciding the path geometric shape of the block, comprising: computing a point position or a pre-read point; judging whether the block is ended; and if yes, determining that the point position or the pre-read point is a terminal;
    when the path geometric shape is a straight line, decreasing the number of the coordinate of the coordinate set of points; and
    when the path geometric shape is a circular arc, increasing the number of coordinate of the coordinate set of points, wherein the step of increasing the number of coordinate of the coordinate set of points comprises the steps of: computing two slopes out of any three previous consecutive point positions between the terminal and the starting point; and when the two slopes are different, then increasing the number of coordinate of the coordinate set of points.

* * * * *